March 4, 1969  KAN ISHIZAKI ET AL  3,430,343
CUTTER
Filed Jan. 3, 1967  Sheet 1 of 3
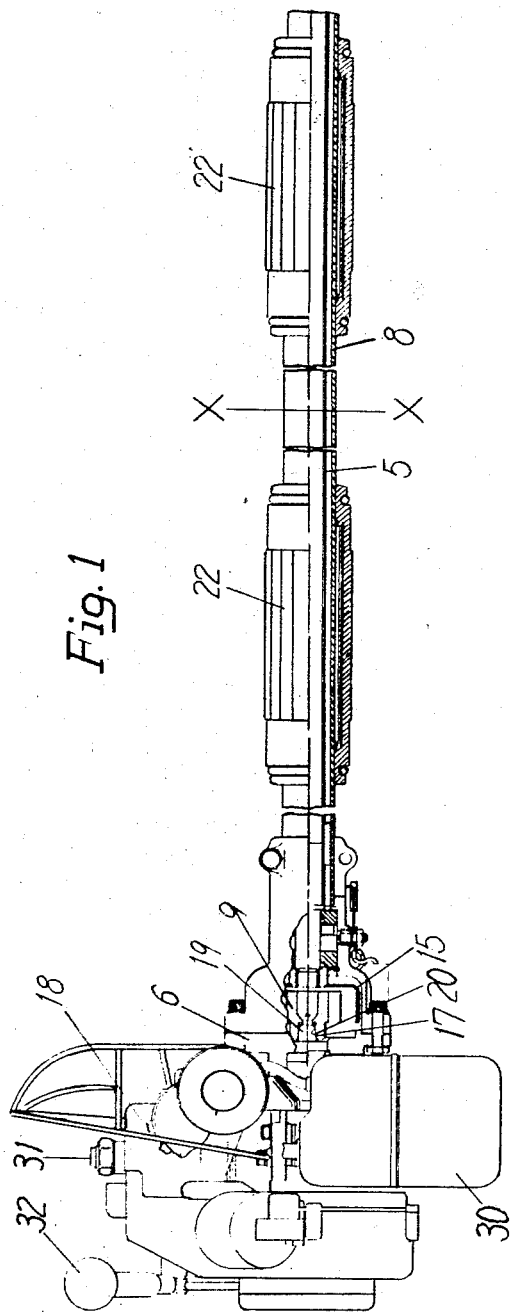
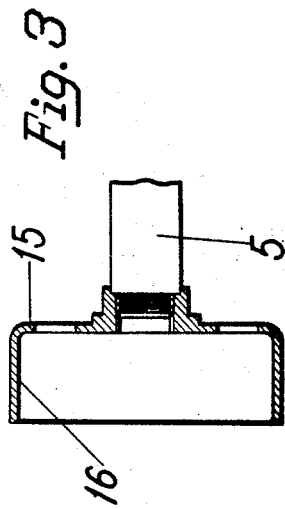
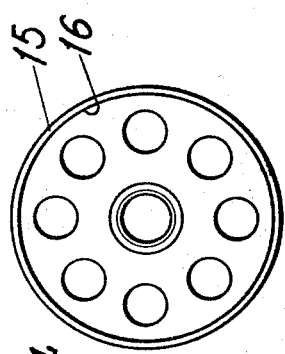
INVENTORS
Kan Ishizaki and
Hajime Noto
BY
Attorney March 4, 1969    KAN ISHIZAKI ET AL    3,430,343
CUTTER
Filed Jan. 3, 1967    Sheet 2 of 3

INVENTORS
Kan Ishizaki and
Hajime Noto
BY
[signature]
Attorney

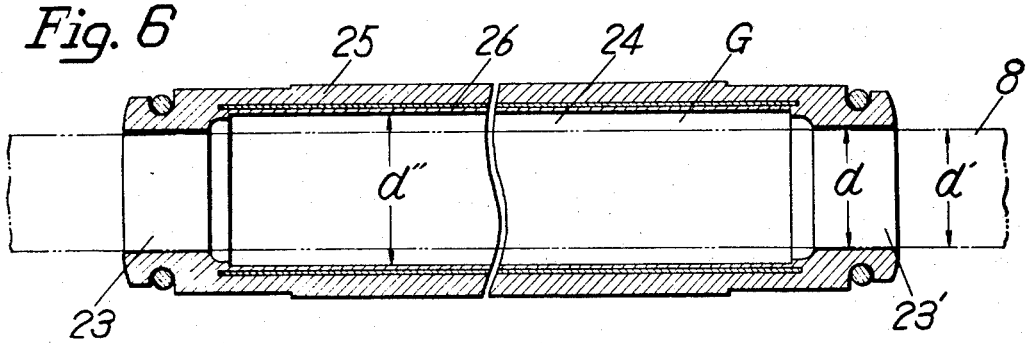
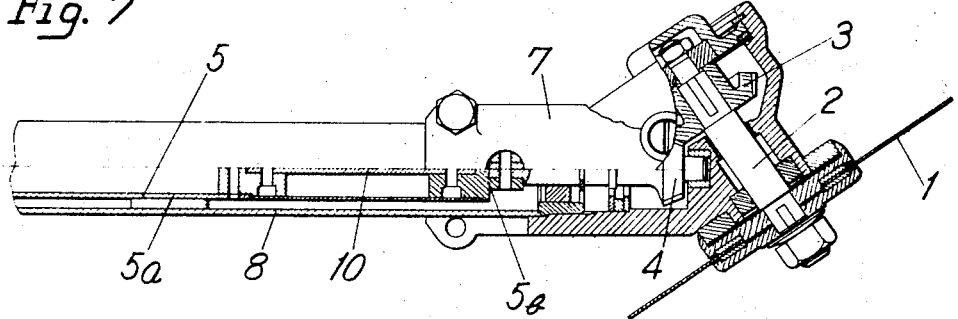
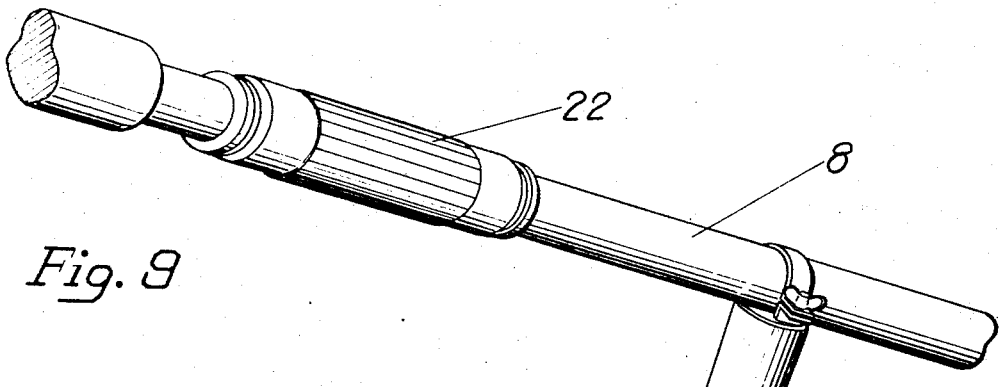
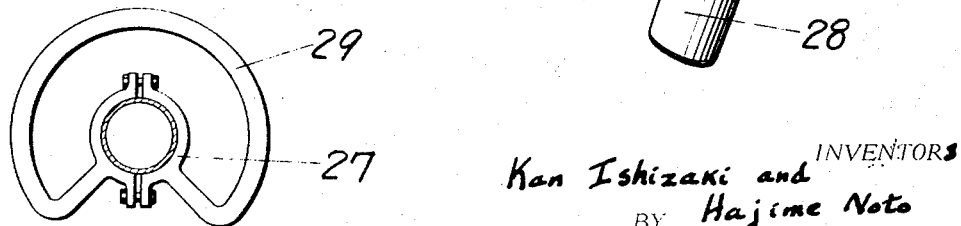

United States Patent Office 3,430,343
Patented Mar. 4, 1969

3,430,343
CUTTER
Kan Ishizaki and Hajime Noto, Tokyo, Japan, assignors to Shingu Shoko, Ltd., Inaho-cho, Otaru Hokkaido, Japan
Filed Jan. 3, 1967, Ser. No. 606,716
U.S. Cl. 30—276     3 Claims
Int. Cl. B26b 7/00; B67b 9/04

ABSTRACT OF THE DISCLOSURE

This invention relates to a cutter, and more particularly, to a bush or vine cutter comprising an outer barrel, a driving shaft rotatably supported by the barrel and extending through the barrel, a rotary blade member fitted to one end of the driving shaft, a prime mover fitted to one end of the barrel opposite to the rotary blade member and connected to another end of the driving shaft, and handles fitted to the barrel, said handles being positioned so that an operator can handle the cutter freely and easily under any hazards.

Background of the invention

Heretofore, in this kind of conventional cutters, grips were usually mounted on the U-shaped handle, similar to the bicycle handle, mounted halfway on the outer barrel. In the case of these conventional cutters, the cutter proper was sustained by the operator by means of a shoulder band or strap attached to an engine cover or to the extreme end of the outer barrel, and the grip merely served as the guide member for fixing the bearing of the cutting operation. Consequently, cutting range was restricted to a relatively small area with relation to the length of the band being used and small turns were a matter of difficulty. On the other hand, the handles of the cutter according to the present invention serve not only as the guide member for cutting operation, but also as the support member for the cutter proper. As a result, cutting range may be enlarged considerably notwithstanding the relatively small scope of movement of the operator and cutting operation may be conducted by the operator simply by having his hands extended or retracted during cutting. Moreover, cutting operation may be conducted on any site such as plane site, upgrade and downgrade and, in addition, overgrown branches of trees may also be trimmed without any difficulty by using this cutter.

Summary of the invention

An object of the present invention is to provide a cutter which not only is small-sized, light in weight and convenient for transportation, but is so constructed as not to make the operator feel extremely fatigued due to the cutting operation going on for a considerable period of time by so locating the grip positions of the cutter proper that the latter may be held by the operator most naturally during cutting operation.

Another object of the present invention is to provide a cutter whereby cutting operation may be facilitated and cutting range may be considerably enlarged by a small bit of manipulation on the part of the operator by so locating the grip positions of the cutter proper that the latter may be held by the operator most naturally during cutting operation, and also by locating the center of gravity of the cutter proper between the two grip positions of the cutter proper gripped by the operator with his hands.

A further object of the present invention is to provide a cutter wherein the driving shaft thereof is provided with a shock absorber whereby any vibrations produced during cutting operation by the cutter may not be transmitted to the engine thereby affecting the performance of the engine seriously.

A still further object of the present invention is to provide a cutter whereby disagreeable sensation and fatigue given to the operator may be lessened by so locating the grip positions of the cutter proper that the latter may be held by the operator most naturally during cutting operation, and also by providing a buffer space between the grip members and the outer barrel enclosing driving shaft therein so as to reduce the effects of vibrations produced during cutting and any rotatory vibrations produced by the engine. With these objects in view and other objects hereinafter set forth, the present invention will now be described in detail with reference to the accompanying drawings in which some preferred embodiments of the present invention are illustrated.

Brief description of the drawing

FIG. 1 is a side elevational view showing the overall structure of the cutter according to the present invention, with some portions thereof being cut away;

FIG. 3 is a sectional side elevation of the clutch drum;

FIG. 4 is a plan view of the clutch drum;

FIG. 6 is a sectional side elevation of the grip member;

FIG. 7 is a perspective view showing a shock absorber provided to the foremost part of the driving shaft; and FIGS. 8 and 9 are the side elevational and plan views respectively showing further embodiments of the grip member.

Description of the preferred embodiments

Figure 2:
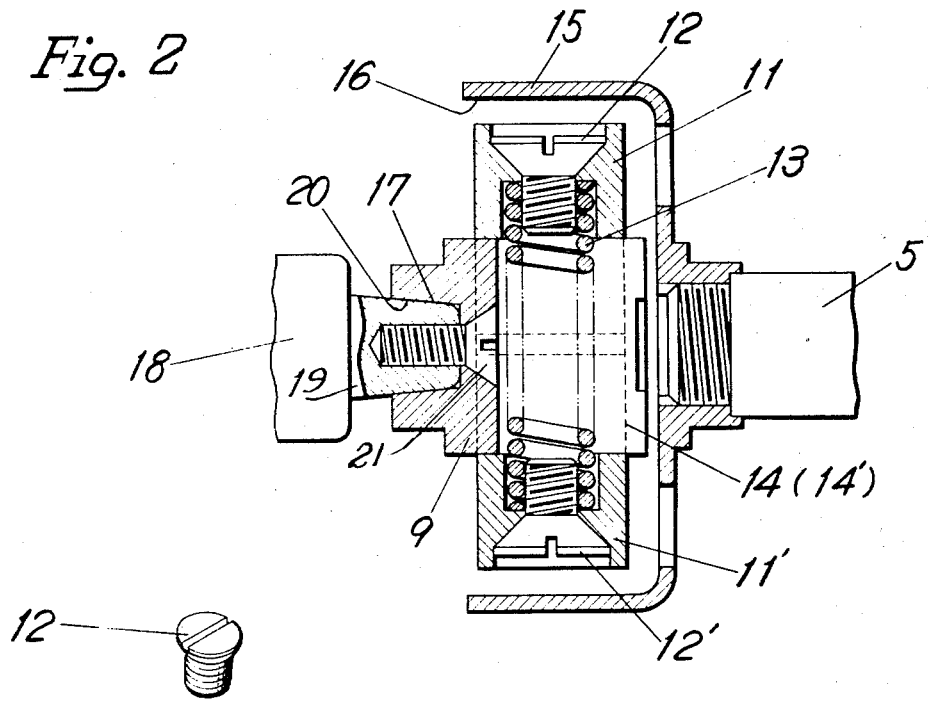
FIG. 2 is a sectional side elevation showing the clutch member interposed between the engine and the output shaft.
Figure 5:
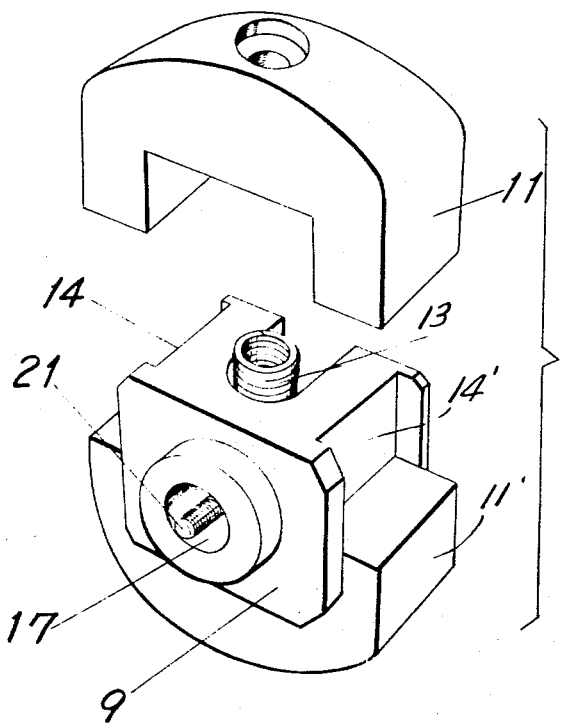
FIG. 5 is a perspective view showing the clutch rotor and clutch shoes as assembled or put together.

The cutter according to the present invention is made up of a rotary blade member, an outer barrel enclosing a driving shaft therein, and an engine. A rotary cutting blade 1 is secured to a shaft 2 driven in gear with a rotary driving shaft 5 through the intermediary of bevel gears 3, 4. The driving shaft 5 mounted extending longitudinally in the inside of an outer barrel 8 secured at one end to an engine chassis 6 and at the other end to a rotary blade housing 7 is interconnected to a clutch rotor 9. The same shaft 5 is divided into two sections 5a, 5b with a steel bar 10 interposed therebetween. Although the two shaft sections 5a, 5b rotate simultaneously, any vibrations accompanying the cutting operation may be effectively attenuated and are not transmitted towards the engine.

Reference numerals 11, 11' indicate clutch shoes slidably fitted into corresponding grooves 14, 14' provided on the rim portions of the clutch rotor 9 through the intermediary of a spring 13 secured at both ends thereof to the clutch shoes 11, 11' by means of screws 12, 12' threadedly provided to said clutch shoes 11, 11'. Reference numeral 5 indicates a cup-shaped clutch drum having a circumferential portion 16 thereof concentric with the clutch shoes 11, 11' and threadedly mounted at the one side thereof to the one end of the above-mentioned driving shaft 5. Reference numeral 17 indicates a tapered recess formed at one side of the clutch rotor 9 and in registry with the tapered end of the output shaft 19 of the engine 18. Also, the output shaft 19 and the clutch rotor 9 are tightly interconnected by means of a screw 21.

Supposing that the engine 18 has started to rotate and the revolution of the output shaft 19 thereof has attained more than a predetermined number of revolutions, then the clutch shoes 11, 11' will slide outwardly on the peripheral grooves 14, 14' provided on the rim portions of the clutch rotor 9 by centrifugal force, against the tension of the spring 13, and are abutted against the inside periphery of the clutch drum 16. At this time, the clutch drum 15 will rotate therewith, and the rotatory driving power developed by the engine is transmitted to the rotary driving shaft 5. On the other hand, if the revolution of the engine 18 has decreased below a predetermined number of revolutions, then the spring force of the spring 13 overcomes the centrifugal force exerted on the clutch shoes, contrary to the above-described case, and the clutch shoes 11, 11' are displaced inwardly. As a result, the clutch shoes 11, 11' are detached from the internal periphery of the clutch drum 16 and, although the engine 18 is rotated in the interim at a slow speed, rotation of the driving shaft 5 ceases. Also, the clutch rotor 9 and the output shaft 19 put together by means of screw 21 are interconnected more tightly by engagement of the tapered recess 17 provided to the clutch rotor 9 and the tapered end 20 of the output shaft 19.

Reference numerals 22, 22' indicate grip members fitted to the outer barrel 8 having the driving shaft 5 enclosed therein. The diameter $d$ of the holes 23, 23' on the left-hand and right-hand sides of the grip is approximately equal to the outside diameter of the outer barrel 8, while the diameter of the hole 24 provided about the center of the grip member is made slightly larger than the diameters $d$ or $d'$, thus leaving a gap G between its periphery and the periphery of the outer barrel 8. Reference numeral 25 indicates a rigid tubular member made from metals or the like and moulded into the elastic materials 26 such as synthetic rubber or synthetic resin that make up the grip members. With such construction of the grip members, any rotational vibrations produced by the engine or rotary blade and transmitted to the outer barrel 8 may be attenuated effectively due to the presence of the gap G and also due to the elasticity of the materials that make up the grip members per se and the operator may be safeguarded against disagreeable vibrations accompanying the cutting operation by the cutter and may also be relieved of fatigue. The grip members 22, 22' are positioned on the outer barrel 8 with an adequate spacing therebetween so that the operator may grip the rod-like outer barrel 8 with his hands without any forced motion on the part of the operator and, moreover, since the center of gravity X of the cutter proper is located about halfway between these two grips 22, 22', not only manipulation of the cutter may be made more easy, but the weight sensation imparted to the operator because of inequality of the weights on the two grip members may be eliminated.

In the drawings, reference numerals 27, 28 indicate grip members according to further embodiments of the present invention, and the grip member 27 is mounted on the outer barrel instead of the above-mentioned grip member 22'. This grip member 27 is provided with a ring-like member 29 and the operator may hold the cutter by gripping the member 29 at any desired portion thereof. The grip member 28 is mounted on the outer barrel 8 projectedly at right angles therewith, so it may be used conveniently for turning the rotary blade member to the desired direction. Additionally, reference numeral 30 indicates fuel tank, reference numeral 31 indicates an ignition plug and reference numeral 32 indicates an ignition rope.

Although the present invention has so far been described in detail with reference to certain preferred embodiments thereof, it is to be noted that the same is not restricted thereto, but may comprise all other structures coming within the spirit and the scope of the invention defined in the appended claims.

We claim:
1. A portable cutter comprising a straight, elongate tubular barrel,
a drive shaft rotatably mounted in said barrel and extending through said barrel and comprising two axially aligned sections,
shock-absorbing means connecting said sections,
a motor mounted on one end of said barrel,
a centrifugally operated clutch releasably connecting said motor to the corresponding end of said shaft for driving said shaft from said motor,
a rotary blade connected to the opposite end of said shaft to be driven thereby upon operation of said motor, and
a pair of tubular grips mounted on said barrel coaxially thereof and at opposite sides of the center of gravity of said cutter, respectively,
each grip comprising an elastic tubular member having a central portion spaced radially from said barrel, and each being of reduced internal diameter at its two ends to frictionally engage said barrel to hold the grip frictionally against axial movement on said barrel.

2. A cutter as defined in claim 1, wherein each grip has a rigid sleeve embedded in the portion thereof which is radially spaced from the barrel.

3. A cutter as defined in claim 1, wherein said shock-absorbing means is a steel bar, which is operative to attenuate vibrations in said shaft resulting from operation of said cutter.

References Cited

UNITED STATES PATENTS

| | | | |
|---|---|---|---|
| 2,697,457 | 12/1954 | Lawrence | 30—276 X |
| 1,317,730 | 10/1919 | Ryan. | |
| 1,084,912 | 1/1914 | Trufant | 64—27 |
| 2,263,431 | 11/1941 | White | 30—276 X |
| 3,189,069 | 6/1965 | Stowell | 145—61 |

FOREIGN PATENTS 1,179,412  10/1964  Germany.

JAMES L. JONES, JR., *Primary Examiner.*

U.S. Cl. X.R.

143—43